Oct. 24, 1939.  H. VAN DER SCHALIE  2,177,505
FILM DEVICE
Filed March 6, 1937  2 Sheets-Sheet 1
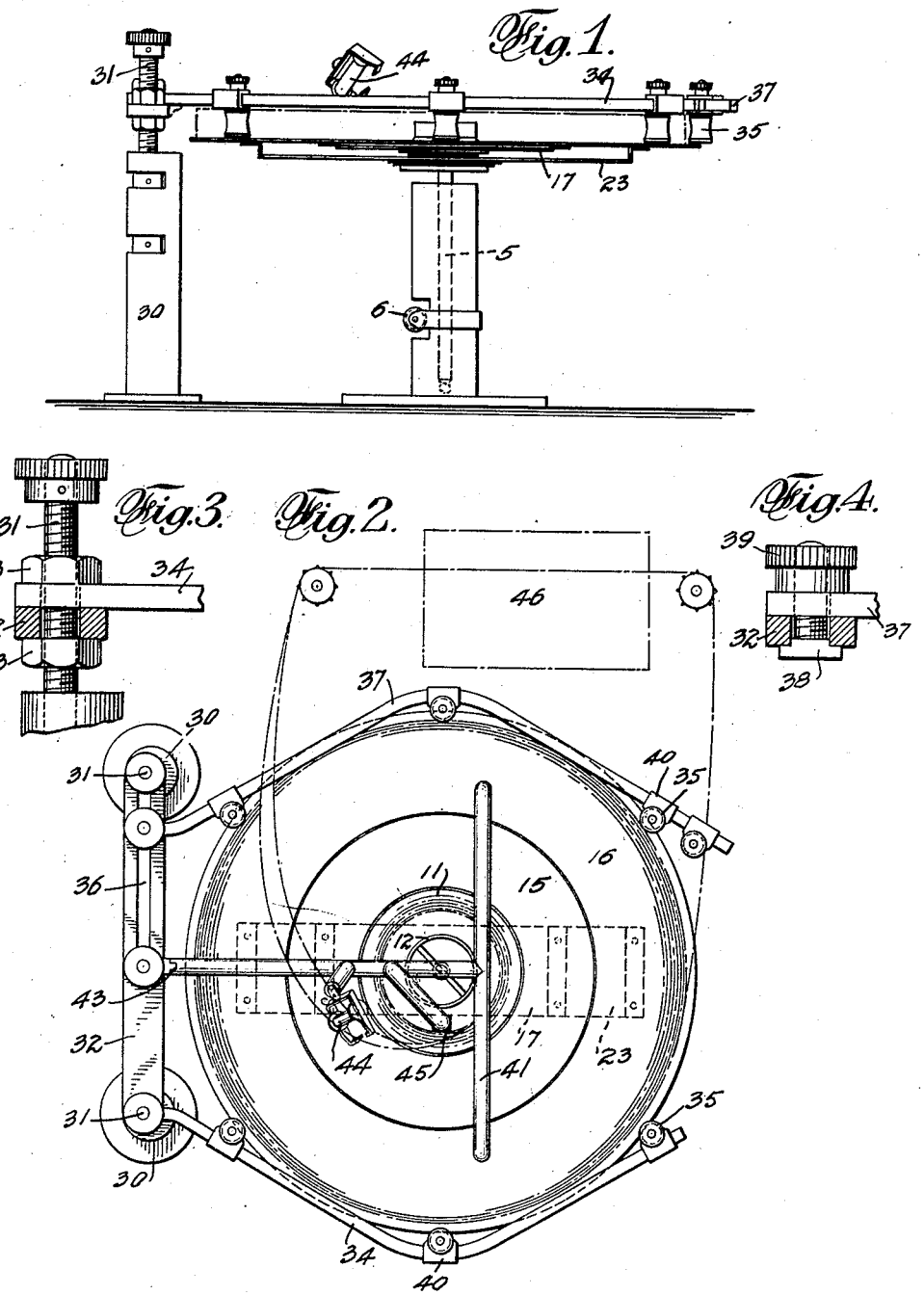
INVENTOR
HENDRIK VAN DER SCHALIE
BY
ATTORNEYS Oct. 24, 1939.    H. VAN DER SCHALIE    2,177,505
FILM DEVICE
Filed March 6, 1937    2 Sheets-Sheet 2
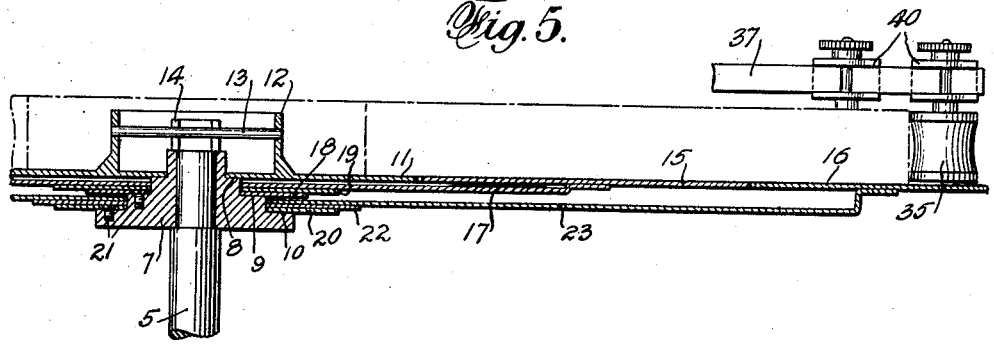
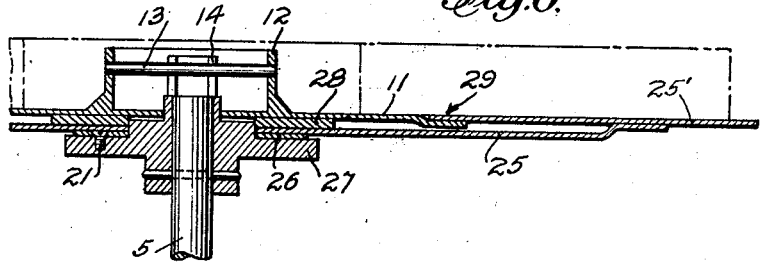
INVENTOR
HENDRIK VAN DER SCHALIE
BY
ATTORNEYS Patented Oct. 24, 1939

2,177,505

UNITED STATES PATENT OFFICE 2,177,505

FILM DEVICE

Hendrik van der Schalie, The Hague, Netherlands, assignor to Hendrik van der Schalie Corporation, Ridgewood, N. J., a corporation of New Jersey Application March 6, 1937, Serial No. 129,389
In the Netherlands March 10, 1936

5 Claims. (Cl. 88—18.7)

My invention relates to a film device of the type wherein the continuous roll of film is supported on a turntable and drawn out from the core and rewound from the outside after having passed through suitable apparatus such as a projector.

This application is a continuation in part of my application, Serial No. 102,134, filed September 23, 1936.

Various devices of the type indicated have been proposed, but, so far as I am aware, have been subject to many defects, one principal defect being that it has been difficult to so drive or synchronize the various parts as to cause the film to be properly fed out from the core and properly rewound from the outside of the roll and all without injury to the film. Another defect has been the difficulty of adapting the film device to films of different widths as well as films of different lengths.

It is the general object of my invention to provide a film device of the character indicated which will overcome many of the objections in devices of a similar nature heretofore proposed, and which is simple in construction, relatively easy to manufacture, and not likely to get out of order.

It is a more specific object to provide a film device of the character indicated, wherein the turntable to carry a roll of film includes a plurality of concentric disks, at least one of which is frictionally driven and the driving force determined at least in part by the weight of the film resting thereon.

It is another object to provide a film device of the character indicated, wherein the turntable comprises a plurality of concentric disks, at least one of which is frictionally driven and wherein the frictional driving means may be readily varied to obtain the desired driving effect.

Another object is to provide a film device of the character indicated, with improved means for supporting or guiding a roll of film on a rotating turntable.

Another object is to provide a film device of the character indicated having various adjustable features to accommodate rolls of film of varying diameters and widths.

It is another object to provide a device of the character indicated which will provide for a floating action of a film, thus avoiding film wear and damage.

Other objects and various features of invention will be hereinafter pointed out or will become apparent to those skilled in the art.

In the drawings which show, for illustrative purposes only, preferred forms of the invention—

Fig. 1 is a view in side elevation of a film device, illustrating features of the invention;

Fig. 2 is a top plan view of the film device shown in Fig. 1 and indicating the film being fed out from the core and rewound on the outside of the roll;

Fig. 3 is an enlarged, partially sectional view of a detail;

Fig. 4 is an enlarged fragmentary detail of means for adjustably holding a guide arm in position;

Fig. 5 is an enlarged central vertical sectional view of that form of the invention shown in Figs. 1 and 2;

Fig. 6 is a view similar to Fig. 5, illustrating a modification.

My improved film device includes a turntable formed of a plurality of concentric disk members all preferably arranged flush with each other. The initial drive for the turntable may comprise a vertical shaft 5 supported in a suitable bearing or standard and driven as by means of a worm 6 meshing with a worm (not shown) on the shaft 5, as will be understood.

In the preferred form the speed of the shaft 5 will be so related to the speed of the driving means of the projector that the speeds of the turntable to be hereinafter described will be such as to properly feed out the film at the center and properly rewind the same at the outside of the roll after the free intermediate portion of the film has been fed through the projector.

In the form shown in Figs. 1, 2 and 5, the shaft 5 is provided at the top with a central hub 7 and a plurality of step flanges or supports 8—9—10, the number depending upon the number of disks comprising the turntable. The innermost turntable disk 11 rests upon the step or flange 8 and an upstanding core member 12 on the disk 11 carries a cross pin 13 which fits in a transverse slot 14 provided in an upstanding part of the hub 7. It will be seen, therefore, that the innermost turntable disk 11, together with its core member 12, will be positively driven with the shaft 5. The outer disks 15—16 consist of flat, annular disks extending at their edges into close proximity to the adjacent edges of the other disks, as will be clear from Figs. 2 and 5. All of the disks are preferably so arranged that together they form a flat turntable for the roll of film shown in dot-dash lines in Figs. 1 and 5 and indicated in part in Fig. 2.

The intermediate disk 15 in the form shown is frictionally driven from the central shaft 5 and is preferably carried by a bridge member 17, which may be doweled or otherwise secured to the disk 15 and be carried from the intermediate step or bearing 9 on the central hub. In the form illustrated the step 9 has secured thereto by screws 21 a bearing plate or washer 18 preferably of friction material, and a second preferably larger washer of friction material 19 rests on the supporting washer 18. The bridge member 17 has an opening loosely fitting about the hub and the bridge member itself rests upon the upper friction disk 19. On the lower step 10 there is a bearing disk 20, preferably of friction material, which may be secured to the hub as by means of a screw 21 corresponding to the same screw 21 holding the disk 18 on the hub. A second friction disk 22 rests on the disk 20 and a second bridge member 23 rests upon and is frictionally driven by the friction disk 22. The outermost turntable annular disk 16 rests upon and may be doweled or otherwise secured to the bridge 23, as will be understood.

It will be clear then that with the roll of film resting on the turntable and threaded through a projector as shown in Fig. 2, upon rotation of the shaft 5 the innermost disk 11 will be positively driven and the film at the core will be fed out or will be assisted in feeding out by such positive rotation. That portion of the film resting on the intermediate disk 15 clearly should rotate at a lesser speed than at the core and that part of the film resting on the outermost disk 16 should rotate at a still lesser speed in order that the film may be rewound. In accordance with my invention, the speeds imparted to the outermost portion of the roll of film and the intermediate portion will be determined by the frictional driving forces imparted to the bridge members by the friction driving means heretofore described. The frictional driving forces will be influenced by the weights of the bridges, the weights of the turntable disks carried thereby, as well as those portions of the film roll carried by those turntable disks. By removing the friction disks and substituting others having different coefficients of friction or by varying the sizes of the friction disks, the desired driving speeds of the various parts of the film roll may be readily obtained. By means of my invention, the film is rolled up at the outside, fed inwardly as film is removed at the core, and there is no under nor overfeeding, nor overwinding, nor underwinding. By driving the disks independently of each other each part of the film roll will be driven and fed inwardly at just the desired rate and the film may be said to "float" on the turntable so as to avoid undue friction between the convolutions and wear or damage to the film.

It will be noted that in the form of the invention shown in Figs. 1, 2 and 5, the three turntable disks are driven independently of each other and, as stated, the frictional driving forces imparted to the outermost disks are determined as heretofore noted.

In the form shown in Fig. 6, wherein similar parts are designated the same as in the other figures, the bridge 25 carrying the outermost disk 25' (only two being shown in Fig. 6) is interposed between a supporting friction disk 26 resting on the hub flange 27 and a second, preferably larger, friction disk 28 upon which in turn the innermost friction disk 11 rests. It will therefore be seen that the friction forces driving the outermost disk 25' will be affected by the weight of the outermost disk 25' and that part of the film carried thereby, as well as by the weight of the innermost disk 11 and that part of the film carried by the latter. In this form, also, by varying the disks 26 or 28, or both, the desired driving force for the outermost disk 25' may be obtained.

In the form illustrated in Fig. 6, the disks 11, 25' are arranged in overlapping relationship, as indicated at 29, and the innermost disk may also have some driving action at that point on the outermost disk.

The roll of film carried by the turntable is supported thereon by improved means. As illustrated, I employ a pair of columns 30—30 carrying threaded members 31—31. A bridging member 32 is supported by the threaded members 31 as by means of nuts 33—33, as will be understood. Supported above the bridging member 32 is a guide arm 34 which is normally fixed in the position shown; that is, so that the film roll guides in the form of rollers or other means 35—35 will be positioned adjacent the edge of the turntable to prevent accidental dislodgment of the film roll from the turntable. The bridging member 32 is slotted at 36 and a second supporting or guide arm 37 is adjustably supported along the slotted portion 36 of the bridging member 32. In the form shown a screw member having a head 38 passes through the slot 36 and a nut 39 at the top of the screw may be turned up to secure the supporting arm 37 in just the desired position. It will be seen that the adjustment of the arm 37 in the slot 36 may be parallel with itself, that is to say, in a direction generally radially of the film roll and along a diameter thereof. Furthermore, the arm 37 may be swung about the screw member as a pivot and still further adjustment may be provided by moving the clips 40 carrying the film engaging rolls or other means 35 along the bent arm 37. Very fine adjustments may be secured since the adjustments along the arm 37 are almost tangential to the roll of film and the latter may therefore be very accurately positioned, whether the desired positioning be strictly central or slightly eccentric of the turntable. In addition to the adjustments heretofore noted of the arms 34 and 37, it will be clear that they may both be raised or lowered on the threaded members 31 by properly positioning the nuts 33—33 so that films of different widths may be properly accommodated.

In order to prevent any possibility of the film, particularly near the core, from rising up and tangling, I may provide a hold down bar 41, carried on an arm 42, which may be pivoted at 43 to a part of the bridging member 32. The arm 41 rests across the roll of film adjacent the core and tends to hold down the entire film but permits the innermost layer of the film to be fed out as indicated particularly in Fig. 2. The arm 42 may carry suitable guide means 44—45 for guiding the film out from the center and through the projection apparatus 46, as will be understood.

While the invention has been described in considerable detail and preferred forms illustrated, it is to be understood that various changes may be made, such as variations in the number and sizes of the disks, and that various modifications may be made, all within the scope of the invention as defined in the appended claims.

I claim:

1. In a device of the character indicated, a central driving hub having a plurality of step flanges thereon, bridge members supported by said flanges, and friction members interposed between said step flanges and bridge members, and concentric disk members respectively carried by said bridge members and driven thereby.

2. In a device of the character indicated, a central rotatable driving hub having at least two vertically spaced upwardly facing supporting surfaces thereon, a plurality of concentric members, one of said members having a bearing extending over the lower of said supporting surfaces and an annular film supporting surface, a friction plate on the hub and interposed between said bearing and said lower supporting surface whereby upon rotation of said hub said member will be frictionally driven by said friction element, a second of said members having a bearing surface extending over the other surface of the hub and a film carrying surface within the said annular surface and a second friction element supported from said last mentioned surface and interposed between said last mentioned surface and the bearing surface of the said second of said members.

3. In a device of the character indicated, a central rotatable driving hub having an upwardly facing supporting surface thereon, a flat film carrying member having a bearing extending over said supporting surface to be supported thereby, a friction element interposed between said supporting surface and said bearing, a second friction element engaging the top of said film carrying member and means rotatable with the hub for forcing said second friction element down on said member.

4. In a device of the character indicated, a central rotatable driving hub having an upwardly facing supporting surface thereon, a bridge member having a central hub part to extend over and be supported by said supporting surface, a friction element beneath said central hub part and interposed between said part and said supporting surface whereby upon rotation of said driving hub said bridge member will be frictionally driven thereby, a film supporting annular plate carried by said bridge member, and a member having a flat film supporting surface rotatably supported on the driving hub within the annular plate.

5. In a device of the character indicated, a central rotatable driving hub having an upwardly facing supporting surface thereon, a supporting member having a bearing extending over said supporting surface to be supported thereby and an annular film supporting surface, an inner core member, means for connecting the same for rotation with and for axial movement on said hub, said core having a part extending over said part supported by said supporting surface and a film supporting surface within the said annular surface and acting by gravity to force said supporting member downwardly and a friction element between the core and supporting member.

H. VAN DER SCHALIE.